(12) United States Patent
Timko et al.

(10) Patent No.: US 11,286,432 B2
(45) Date of Patent: Mar. 29, 2022

(54) HYDROTHERMAL LIQUEFACTION FOR BIOMASS

(71) Applicant: Worcester Polytechnic Institute, Worcester, MA (US)

(72) Inventors: Michael T. Timko, Arlington, MA (US); Geoffrey A. Tompsett, Shrewsbury, MA (US); Alex R. Maag, Ithaca, NY (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 16/583,582

(22) Filed: Sep. 26, 2019

(65) Prior Publication Data

US 2020/0109336 A1    Apr. 9, 2020

Related U.S. Application Data

(60) Provisional application No. 62/736,697, filed on Sep. 26, 2018.

(51) Int. Cl.
*C10G 53/06* (2006.01)
*C10L 1/02* (2006.01)
(Continued)

(52) U.S. Cl.
CPC .......... *C10G 53/06* (2013.01); *B01J 23/002* (2013.01); *B01J 23/10* (2013.01); *B01J 37/0201* (2013.01); *C10L 1/02* (2013.01)

(58) Field of Classification Search
CPC ... C10G 3/00; C10G 3/47; C10G 3/50; C10G 1/06; C10G 53/06; C10L 1/02
See application file for complete search history.

(56) References Cited

U.S. PATENT DOCUMENTS

| 8,603,295 B2 * | 12/2013 | Dottori | C08H 8/00 162/22 |
| 9,605,085 B2 * | 3/2017 | Chheda | C10G 3/47 |
| 2017/0369789 A1 * | 12/2017 | Hart | C10G 1/06 |

FOREIGN PATENT DOCUMENTS

| WO | WO-2015144856 A1 * | 10/2015 | ............ B01J 35/002 |
| WO | WO 2017/219151 A1 | 12/2017 | |
| WO | WO 2018/076093 A1 | 5/2018 | |

OTHER PUBLICATIONS

Magg et al. (Catalytic hydrothermal liquefaction of food waste using CeZrOx, Mar. 6, 2018, Energies, 11, 564; doi:10.3390/en11030564). (Year: 2018).*

(Continued)

*Primary Examiner* — Youngsul Jeong
(74) *Attorney, Agent, or Firm* — Armis IP Law, LLC

(57) ABSTRACT

Catalyst composition and parameters for catalytic hydrothermal liquefaction of biomass to bio-oil fuels target municipal solid waste (MSW) rather than lignin rich plant waste typically sought for bio-oil production. An HTL (Hydrothermal Liquefaction) reactor generates bio-fuel from municipal solid waste (MSW), including receiving, in the HTL reactor, non-lignin based waste from a municipal processing stream, and adding a solvent for extracting sugars from green waste components of the municipal processing stream. The reactor extracts a liquid from the received waste, and converts water soluble products in the liquid into oil soluble products via C—C (carbon-to-carbon) coupling reactions. A catalyst added to the resulting aqueous stream recovers a beneficial oil product, and is optimized by tuning acid and base sites on the solid catalyst.

9 Claims, 4 Drawing Sheets

(51) Int. Cl.
  *B01J 23/10*    (2006.01)
  *B01J 37/02*    (2006.01)
  *B01J 23/00*    (2006.01)

(56) References Cited

OTHER PUBLICATIONS

Ramirez et al. (A review of hydrothermal liquefaction bio-crude properties and prospects for upgrading to transportation fuels, Energies, 2015, vol. 8, pp. 6765-6794). (Year: 2015).*

Alex R. Magg, et al., Catalytic Hydrothermal Liquefaction of Food Waste using CeZrOx, Energies 2018, 11, 564, pp. 1-14, doi:10.3390/en11030564.

Jerome A. Ramirez, et al, "A Review of Hydrothermal Liquefaction Bio-Crude Properties and Prospects for Upgrading to Transportation Fuels", Energies 2015, 8, pp. 6765-6794, doi:10.3390/en8076765.

International Search Report, PCT/US2019/053084, dated Mar. 5, 2020, pp. 2.

* cited by examiner

HYDROTHERMAL LIQUEFACTION FOR BIOMASS

RELATED APPLICATIONS

This patent application claims the benefit under 35 U.S.C. § 119(e) of U.S. Provisional Patent App. No. 62/736,697 filed Sep. 26, 2018, entitled "HYDROTHERMAL LIQUEFACTION FOR BIOMASS," incorporated herein by reference in entirety.

STATEMENT REGARDING FEDERALLY SPONSORED RESEARCH AND DEVELOPMENT

This invention was developed, in part, with U.S. government support under contract No. DE-SC0015784, awarded by the Department of Energy, and contract No. DE-FOA-0001926, grant #1926-1564. The Government has certain rights in the invention.

BACKGROUND

Production of biofuels and bioenergy has the potential to reduce greenhouse gas emissions, improve energy security, and reduce energy price volatility. Unfortunately, despite significant progress in the past 20 years, conversion of biomass into transportation fuels is not yet directly competitive with fossil fuels. A potential solution to biomass production costs is to use waste feeds that would otherwise require a tipping fee for disposal. Municipal solid waste (MSW), including green waste (e.g., bio-degradable agricultural and yard waste), is especially attractive as a feed for bioenergy production, as MSW disposal costs continue to increase nationwide.

SUMMARY

Catalyst composition and parameters for catalytic hydrothermal liquefaction (CHTL) of biomass to bio-oil fuels target municipal solid waste (MSW) rather than lignin rich plant waste typically sought for bio-oil production. Configurations herein employ an HTL (Hydrothermal Liquefaction) reactor in a method of generating bio-oil from municipal solid waste (MSW), including receiving, in the HTL reactor, non-lignin based waste from a municipal processing stream, and adding a solvent for extracting sugars from green waste components of the municipal processing stream. The reactor stirs or agitates the received waste for extracting a liquid, and converts water soluble products in the liquid into oil soluble products via C—C(carbon-to-carbon) coupling reactions. A catalyst added to the MSW mass or the resulting aqueous stream recovers a beneficial oil product, and is optimized by tuning acid and base sites on the solid catalyst based on the MSW. In contrast to conventional approaches, MSW leverages a different stream that does not require the lignin-dense component that conventional bio-oil and bio-diesel processes require.

Configurations herein are based, in part, on the observation that conventional processes directed towards bio-oil and bio-diesel typically target lignin rich plant based waste streams. Municipal solid waste (MSW), including waste derived from human food consumption and expelled as ordinary household waste, can generate beneficial oil products through the use of an appropriate catalyst in conjunction with hydrothermal liquefaction. Unfortunately, conventional approaches to recycling discharge a substantial quantity of water that has potential to yield these beneficial oil products. MSW contains up to 80% water, and water discharged in waste processing has dissolved carbon that conventional approaches fail to recover. Accordingly, configurations herein substantially overcome the shortcomings of lost carbon and oil compounds by employing a catalyst for recombining smaller carbon molecules dissolved in the waste water into larger, oil soluble molecules. In particular, hydroxyapatite may be employed as a tunable catalyst that can be synthesized according to a ratio of acid and base sites to maximize oil production.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The description below presents an example of an HTL reactor configuration suitable for demonstrating the embodiments claimed herein. Modern recycling efforts have attempted to recover hydrocarbon products from waste materials, and purport to produce oil-based products under such lables as bio-oil and bio-diesel, generally meaning a combustible hydrocarbon useable as a fuel. In configurations herein, a catalyst, and preferable a tunable catalyst, added to the wastewater stream from HTL processing of MSW yields beneficial oil soluble molecules. A tunable catalyst, such as hydroxyapatite, allows a ratio of acid to base sites on the surface of a solid form of the catalyst to be adjusted for maximal oil production for use as a bio-fuel.

Figure 1:
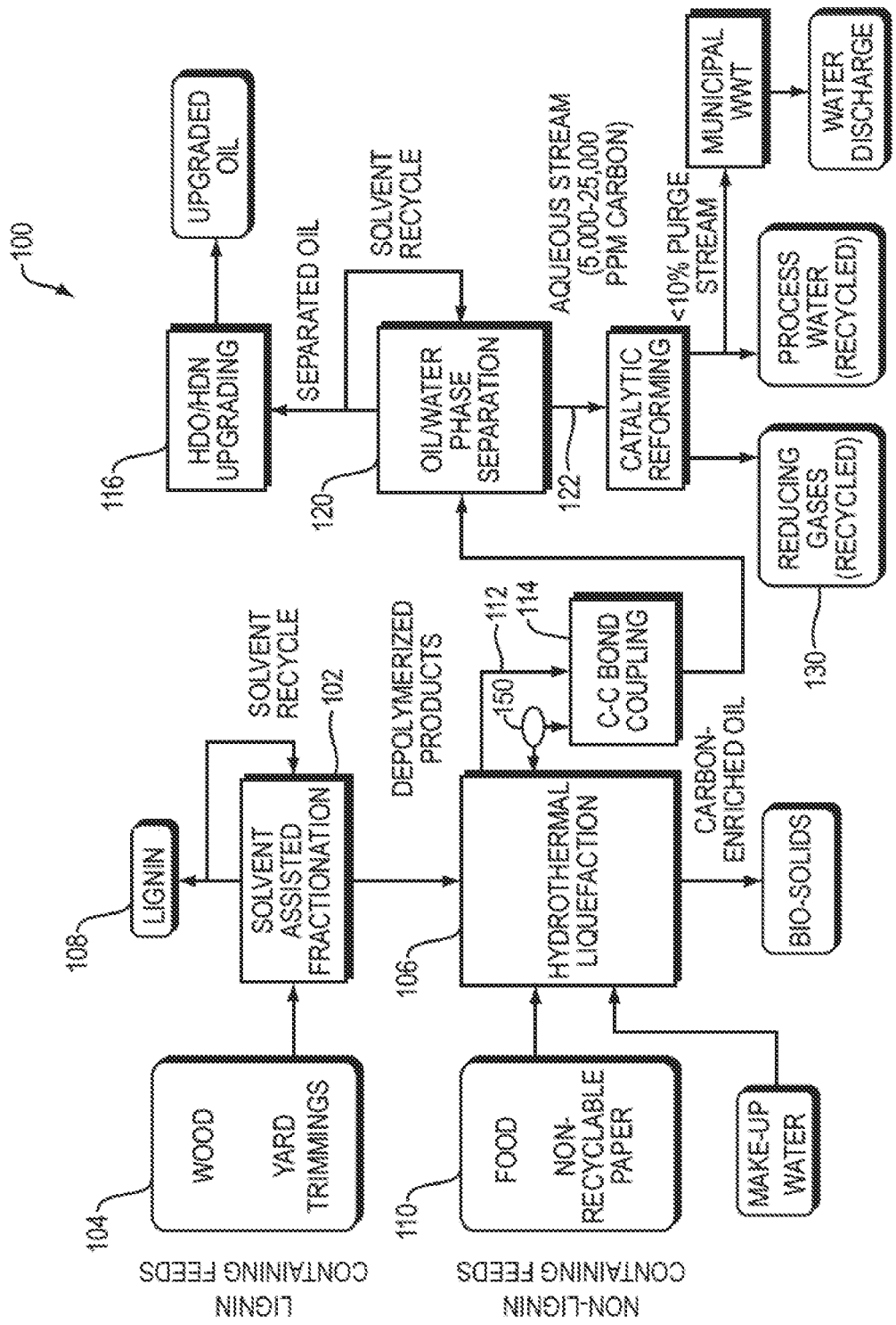
FIG. 1 is a process flow diagram of an apparatus suitable for use with configurations herein.

FIG. 1 is a process flow diagram of an apparatus suitable for use with configurations herein. Referring to FIG. 1, the process flow diagram depicts an HTL process to maximize oil yield and minimize formation of (comparably) low value char. A solvent treatment 102 is employed to extract recalcitrant lignin 108 from green waste components of MSW (i.e., wood and yard trimmings) 104, delivering a desirable sugar-rich holocellulose feed to an HTL reactor 106. The fractionated lignin product 102 itself may have potential use in water purification or as a precursor for production of renewable bio-based materials with applications in electrochemical power storage or production of carbon-fibers. The remaining holocellulose feed will be combined with a food waste stream 110 and fed continuously to the HTL reactor 106 typically a stirred tank reactor. In the absence of extracted lignin 108, the reactivity of the sugar-rich holocellulose stream obtained from green waste will be comparable to that of the carbohydrates, proteins, and lipids contained in food waste, thereby overcoming the challenge presented by mismatched reactivities of the various feed components that normally complicates MSW-to-energy conversion. The HTL reactor 106 is operable under biphasic liquid/solid conditions ensuring selective fractionation and extraction of liquid products only. Insoluble reactants/intermediates will remain in the reactor 106 until they break down to desired, soluble products. This approach minimizes the residence time of primary breakdown products, such as simple carbohydrates, fatty acids, and amino acids, thereby minimizing their re-polymerization to form char. Char that does form will be removed periodically and valorized as biosolids for water purification, soil covering, or soil amendment.

The liquid products 112 exiting the HTL reactor will be fed to a catalytic reactor 114 to convert water soluble products into heavier, oil soluble products via C—C coupling reactions. These liquid products 112 include the wastewater with dissolved carbon that the disclosed catalyst will be added to for oil product extraction, discussed further below in FIGS. 2-4. Bio fuel options are generally provided by carbon-carbon (C—C) coupling reactions to convert water soluble products into heavier, oil soluble products. A selected catalyst 150 may be added to either the liquid product 112 stream, or alternatively added directly to the reactor 106. Carbon-enriched oil is recovered via solvent extraction, following which its oxygen and nitrogen content is reduced to <10%, and subsequently <2% in a second catalytic reactor 120. Inexpensive transition-metal-doped perovskite catalysts for sequential HDN and HDO 116 of bio-oil and model compounds may be employed.

The oil recovered after carbon-carbon coupling 114 may undergo additional oxygen (and potentially nitrogen) removal. Hydrodeoxygenation (HDO) is the preferred oxygen removal approach as it minimizes hydrogen consumption and maximizes carbon yield—hydrodenitrogenation (HDN) is the analogous reaction for nitrogen removal. It has been shown that reducible metal oxides for the conversion of oxygenates to unsaturated hydrocarbons may occur using low $H_2$ pressures. For example, $MoO_3$ offer several benefits as an HDO catalyst: 1) the material is inexpensive and abundant; 2) it is capable of transforming various oxygenate feeds into unsaturated hydrocarbons with the retention of carbon in the products with high activity and selectivity toward C—O bond cleavage using low $H_2$ pressures (about 1 bar); 3) $MoO_3$ exhibits high tolerance to coke formation, water poisoning, and deactivation by adsorption of alkali metals and other contaminants; and 4) the catalyst can be regenerated by calcination without activity loss.

Residual carbon in an aqueous stream 122 exiting the oil separation stage is valorized by supercritical water gasification or aqueous phase reforming. A reducing gas stream 130 produced by gasification may be used for bio-oil upgrading, thereby reducing or eliminating the need for expensive and energy-intensive reducing gas supply or compression. To reduce water consumption, a portion of the water exiting the gasifier may be recycled in the liquefaction reactor 106 to minimize the need for makeup water.

Figure 2:
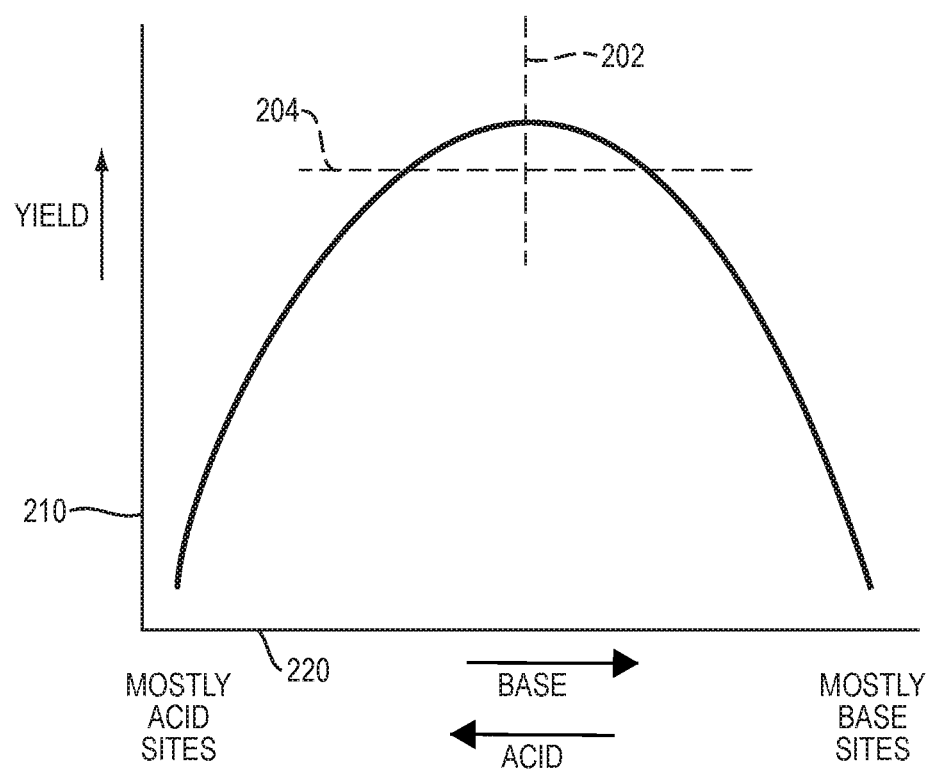
FIG. 2 is a graph of an effect of catalyst tuning in the apparatus of FIG. 1.

FIG. 2 is a graph of an effect of catalyst tuning in the apparatus of FIG. 1. Referring to FIGS. 1 and 2, a tunable catalyst 150 such as hydroxyapatite has a beneficial effect to increase oil yield. Hydroxyapatite is a calcium phosphate material, which is a main constituent of bone, discussed in conjunction with other catalyst selections below. Oil yield 210 plotted against a catalyst ratio 220 of base to acid sites on the catalyst shows a peak yield 202 catalyst performance. In production, hydroxyapatite tuned to a slightly greater proportion of acid sites at yield 204 is likely to be feasible.

Figure 3:
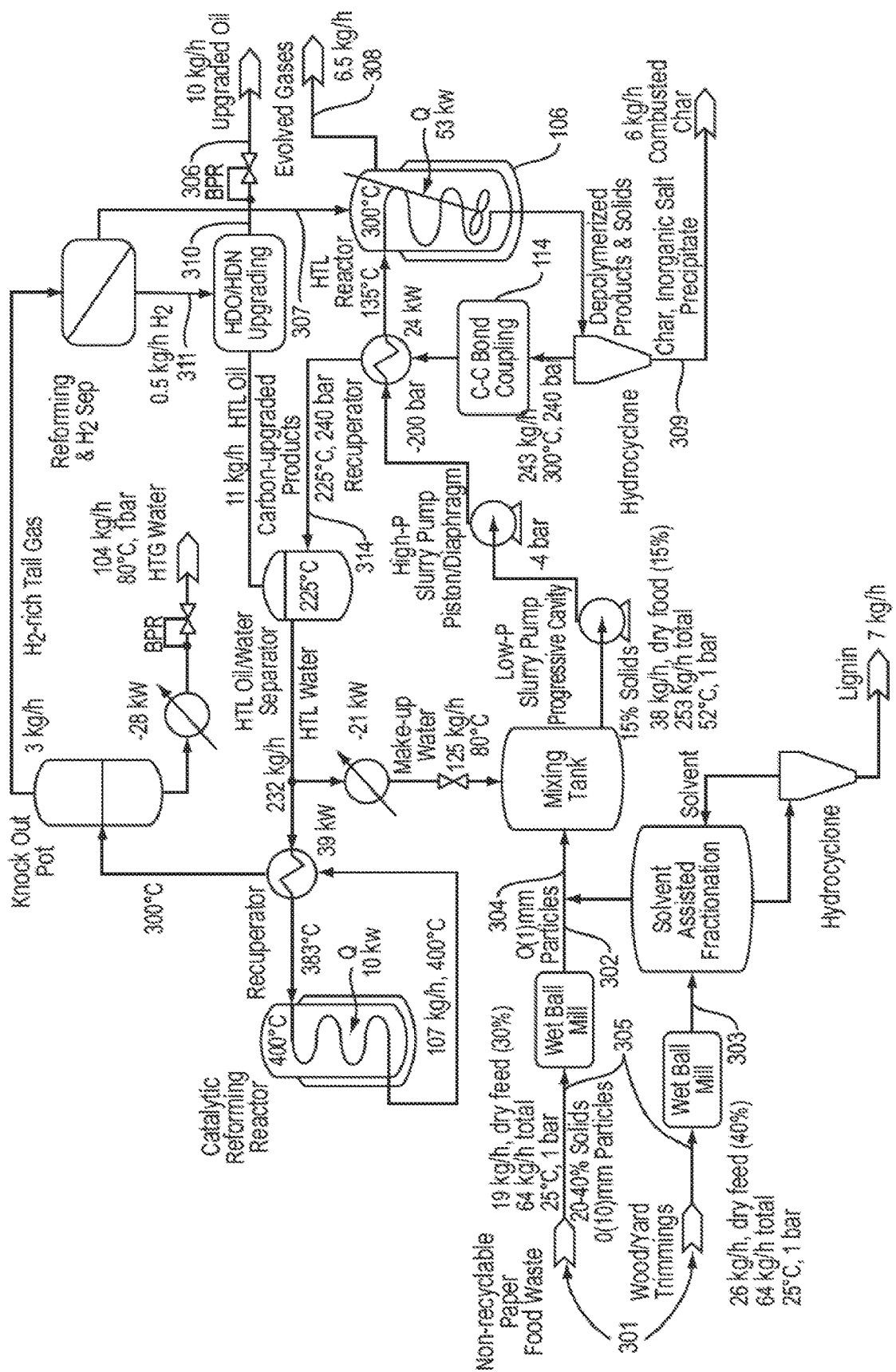
FIG. 3 is a schematic diagram of the apparatus of FIG. 1.

FIG. 3 is a schematic diagram of the apparatus of FIG. 1, and Table I shows corresponding exemplary values. Referring to FIGS. 1 and 3, the carbon upgraded products 314 represent the catalyzed result from C—C bond coupling 114 for combining the aqueous phase, smaller carbon molecules into larger, oil soluble products useful as a bio fuel or other oil product.

TABLE 1

| Reference | Quantity | Value | Source |
|---|---|---|---|
| 301 | Feed rate | 1 dry ton/day (dtpd) | Basis |
| 302 | Water content, food waste and paper | 30% | Typical value |
| 303 | Water content, wood and yard trimmings | 40% | Typical value |
| 304 | Feedstock blend ratio | 1:1 | Matches MSW composition |
| 305 | HHV of Feed, dry | 10,576 btu/lb | Measured (food) |
| 306 | HHV of bio-oil | 13,413 btu/lb | Measured |
| 307 | COD of HTL water | 53 mg/L | EPA limit, Data supports |
| 308 | Hydrogen content of HTL product gas | 18% [v/v] | Measured |
| 309 | Bio-oil yield, dry | 40% | Measured |
| 310 | HDO/HDN upgrading yield | 90% | PNNL Sludge TEA, 2016 |
| 311 | HDO/HDN hydrogen consumption | 0.05 g $H_2$/g bio-oil | PNNL Sludge TEA, 2016 |

Figure 4:
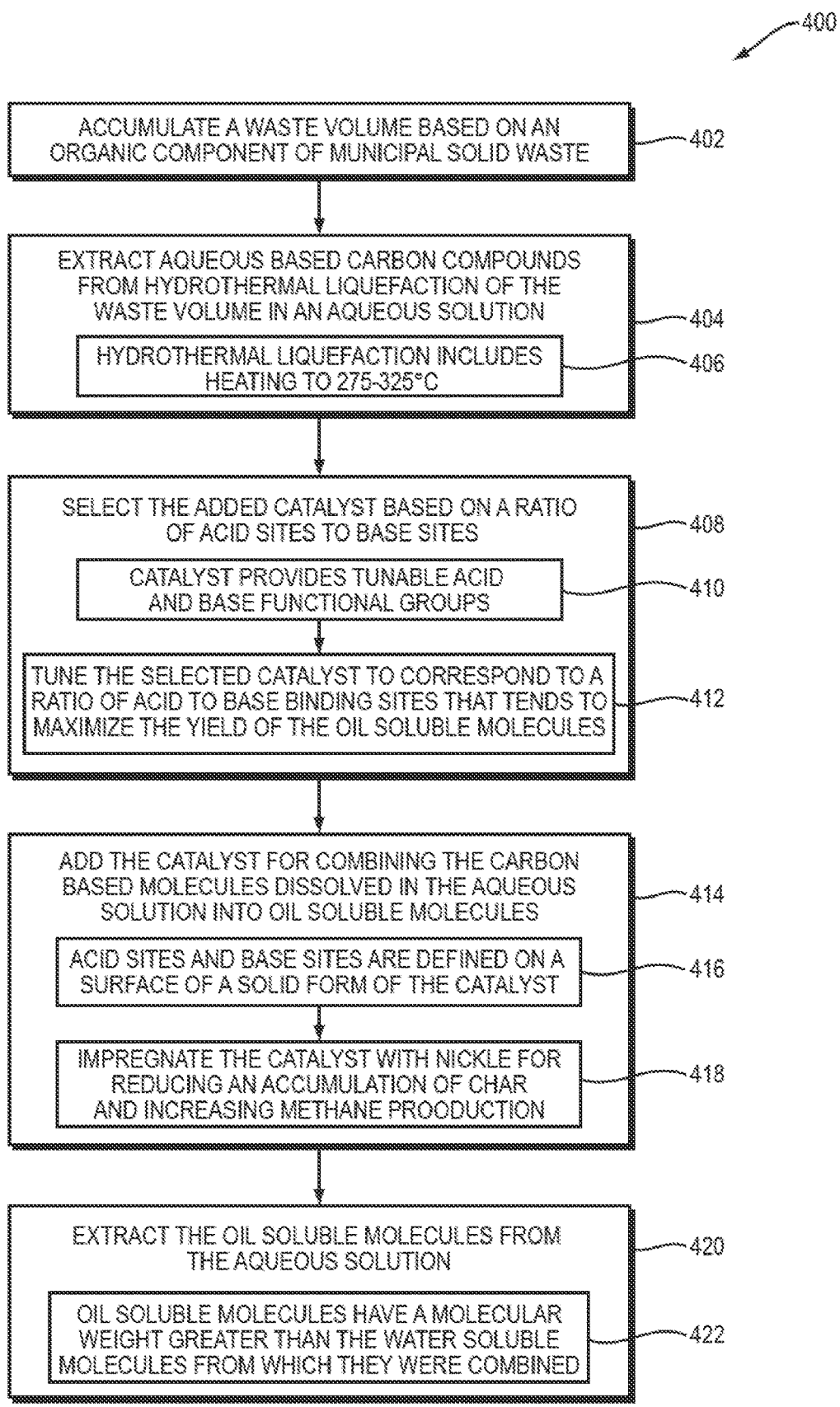
FIG. 4 is a flowchart of catalyst use according to FIG. 3 in the process flow of FIG. 1.

FIG. 4 is a flowchart 400 of catalyst use according to FIG. 3 in the apparatus of claim 1. Referring to FIGS. 1-4, the method for carbon and oil recovery from municipal solid waste includes accumulating a waste volume based on an organic component of municipal solid waste, as depicted at step 402. This may include various combinations of solid and liquid waste, including discarded food (plant and animal), as well as lignin sources including plant matter. Although typical ranges of various food, vegetable and animal content and types can be approximated, the input stream is, of course, substantially varied.

Following the preliminary treatment outlined in FIGS. 1 and 3, aqueous based carbon compounds resulting from hydrothermal liquefaction of the waste volume are extracted as liquid products 112 in an aqueous solution, as shown at step 404. In the example arrangement, this involves hydrothermal liquefaction at a temperature range of 275-325° C., as shown at step 406.

For treatment and bio fuel generation as disclosed herein, the added catalyst is selected based on a ratio of acid sites to base sites, as depicted at step 408. In an example configuration, the catalyst provides tunable acid and base functional groups as disclosed at step 410, allowing catalyst operation to be adjusted and matched to the liquid products 112 based on the input stream(s) to the HTL reactor 106. In general, therefore, the catalyst combines acid and base functionality, such as CeZrOx, hydroxyapatite, and red art clay, for example. Hydroxyapatite is particularly advantageous because Zirconium oxides such as CeZrOx tend to be more expensive.

In the example arrangement, this includes tuning the selected catalyst to correspond to a ratio of acid to base sites that tends to maximize the yield of the oil soluble molecules resulting, as depicted at step 412. Catalysts 150 may be synthesized according to a predetermined acid/base site ratio. The selected catalyst 150 is added for combining the carbon-based molecules dissolved in the aqueous solution exiting the HTL reactor 106 into oil soluble molecules, as shown at step 414 Therefore, the liquid products 112, typically water with dissolved carbon compounds, are combined with the tuned catalyst 150 to result in larger oil soluble molecules.

Generally, the tuning of acid and base sites refers to acid sites and base sites defined on a surface of a solid form of the catalyst, such that the catalyst has a powder form for mixing with the aqueous solution from the HTL reactor, as depicted at step 416. In a particular configuration, the catalyst may be impregnated with or mixed with nickel for reducing an accumulation of char and increasing methane production, as disclosed at step 418.

The oil soluble molecules defining the beneficial bio-fuel are then extracted from the aqueous solution, as depicted at step 420. Generally, the oil soluble molecules have a molecular weight greater than the water soluble molecules from which they were combined, as shown at step 422, due to the C—C coupling enhanced by the catalyst 150.

A major component of the catalytic HTL process is the carbon-carbon coupling step 414, occurring at 114 in FIG. 1. In this step, water soluble intermediates are reacted with one another to increase their molecular weight and decrease their oxygen content, thereby rendering them water insoluble to increase oil yields. Heterogeneously catalyzed carbon-carbon coupling reactions using CeZrOx may be used, but are expensive.

Configurations herein demonstrate that inexpensive, earth-abundant oxide catalysts, including waste materials such as red art clay and material derived from bone, as well as model oxides including iron oxide, calcium oxide, and aluminum oxide, may be employed as catalysts for recovering fuel quality oil products, depicted at step 414. Prices of these materials are as low as $1 per kg. Particular efforts have tested hydrothermal stability up to 165 hr and found minimal leaching, with the exception of calcium from calcium oxides which have been evaluated as model materials only. The benefits of catalysts are to decrease the organic content of the aqueous phase, thereby decreasing carbon loss, and to increase oil yields. For example, HTL processing of a food waste mixture without addition of catalysts results in a water phase containing 24,300 ppm of total organic carbon (TOC). In comparison, HTL using a catalyst such as red art clay (consisting primarily of $Fe_2O_3$ and CaO) produces an aqueous phase with 16,000 ppm TOC, a 50% reduction in organic content compared to thermal HTL. The decreased aqueous phase carbon content comes hand-in-hand with increased oil yield.

For example, the aforementioned red art clay catalyst increases oil yield from 0.12 to 0.27 g g-1, relative to the feed. CeZrOx behaves similarly to red art clay. The use of hydroxyapatite catalyst increases the oil yield to 0.40 g g-1, corresponding to an energy recovery of 43.8% relative to the feed, compared to only 16% obtained under thermal conditions without a catalyst. Catalysts that combine acid and base functionality, such as CeZrOx, hydroxyapatite, and red art clay, can outperform catalysts with only a single functionality—as acidic ($Al_2O_3$) and especially basic materials ($Fe_2O_3$ and CaO) do not match the benefits of multifunctional catalysts. Hydroxyapatite is especially interesting as it achieves 43% energy recovery; moreover hydroxyapatite provides tunable acid and base functional groups. It should be noted, however, that since oil obtained from hydroxyapatite-catalyzed HTL tends to contain more oxygen, it is helpful if downstream upgrading is more robust. Alternatively, $Al_2O_3$—$Fe_2O_3$ composite materials comprise acid and base properties, suggesting alternatives for the tunable catalyst.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for carbon and oil recovery from waste, comprising:
    accumulating a waste volume based on an organic component of municipal solid waste and extracting lignin from the waste volume to obtain a holocellulose feed;
    adding a food waste stream to the holocellulose feed, and conducting a hydrothermal liquefaction of the mixture of the food waste stream and the holocellulose feed to obtain an aqueous solution of carbon based water soluble molecules;
    adding a catalyst which combines acid and base functionality and is selected from: hydroxyapatite, and red art clay, to the aqueous solution of carbon based water soluble molecules thereby upgrading by combining the carbon based water soluble molecules in the aqueous solution by a carbon-carbon (C—C) coupling reaction to convert the carbon based water soluble molecules into heavier, oil soluble products thereby obtaining a mixture of oil soluble molecules; wherein the catalyst increases energy recovery of the holocellulose feed by more than 40% compared to energy recovery without a catalyst; and
    extracting the oil soluble molecules from the mixture to obtain an oil.

2. The method of claim 1 further comprising selecting the catalyst based on a ratio of acid sites to base sites.

3. The method of claim 2 wherein the acid sites and base sites are defined on a surface of a solid form of the catalyst.

4. The method of claim 1 wherein the oil soluble molecules have a molecular weight greater than the water soluble molecules from which they were combined.

5. The method of claim 2 further comprising tuning the catalyst to correspond to a ratio of acid to base sites based on a yield of the oil soluble molecules.

6. The method of claim 5 wherein the catalyst comprises tunable acid and base functional groups.

7. The method of claim 2 further comprising impregnating the catalyst with nickel for reducing an accumulation of char and increasing methane production.

8. The method of claim 1 further comprising heating the waste volume to 275-325° C.

9. The method of claim 1 further comprising conducting hydrodeoxygenation (HDO) on the oil.

* * * * *